United States Patent
Cope et al.

(10) Patent No.: US 7,616,753 B2
(45) Date of Patent: Nov. 10, 2009

(54) SYSTEM AND METHOD FOR PROVIDING INTERCEPT OF INTERNATIONAL CALLS TO REROUTE THE CALL FROM THE DEFAULT INTERNATIONAL ROUTING

(75) Inventors: Warren B. Cope, Olathe, KS (US); Ramaswami Rangarajan, Belmont, CA (US); Jonathan E. Schaff, San Leandro, CA (US)

(73) Assignee: Sprint Communications Company L.P., Overland Park, KS (US)

(*) Notice: Subject to any disclaimer, the term of this patent is extended or adjusted under 35 U.S.C. 154(b) by 947 days.

(21) Appl. No.: 10/837,855

(22) Filed: May 3, 2004

(65) Prior Publication Data

US 2005/0243796 A1  Nov. 3, 2005

(51) Int. Cl.
*H04M 7/00* (2006.01)
(52) U.S. Cl. ............ 379/221.01; 379/220.01; 379/221.02; 370/352
(58) Field of Classification Search .......... 379/201; 370/351, 352, 353, 354, 355, 356
See application file for complete search history.

(56) References Cited

U.S. PATENT DOCUMENTS

| | | | |
|---|---|---|---|
| 6,205,135 B1 | 3/2001 | Chinni et al. | |
| 6,484,200 B1* | 11/2002 | Angal et al. | 709/224 |
| 6,574,319 B2* | 6/2003 | Latter et al. | 379/142.07 |
| 7,046,658 B1* | 5/2006 | Kundaje et al. | 370/352 |
| 2002/0101974 A1* | 8/2002 | Zbib | 379/221.02 |
| 2003/0121967 A1 | 7/2003 | Goldberg et al. | |
| 2003/0123632 A1* | 7/2003 | Smith | 379/220.01 |
| 2003/0235284 A1* | 12/2003 | Fleischer et al. | 379/221.01 |
| 2004/0062210 A1* | 4/2004 | Genter et al. | 370/260 |
| 2004/0218748 A1 | 11/2004 | Fisher | |
| 2006/0251050 A1* | 11/2006 | Karlsson | 370/352 |
| 2007/0147342 A1* | 6/2007 | Piercy et al. | 370/352 |

FOREIGN PATENT DOCUMENTS

WO   WO 00/74337 A   12/2000

* cited by examiner

*Primary Examiner*—Simon King

(57) ABSTRACT

The invention helps solve problems with technology that detects international calls. When an international call is detected a database is queried. Dependent on the results of the database query, present conditions based up on criteria, the call is either routed using international routing or the call is routed using an internet protocol (IP) gateway.

28 Claims, 6 Drawing Sheets

SYSTEM AND METHOD FOR PROVIDING INTERCEPT OF INTERNATIONAL CALLS TO REROUTE THE CALL FROM THE DEFAULT INTERNATIONAL ROUTING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures and services.

2. Description of the Prior Art

Large companies typically have internet protocol (IP) networks connecting many of their various facilities together. They may have facilities in different countries. In some cases these companies use the IP networks to send phone calls between their facility sites and to long distance destinations. Using their internal networks for phone calls can save cost, especially when the calls are international long distance calls. Unfortunately the phone call must typically originate inside one of their facilities to automatically access the internal network. If a phone call originates outside a facility, for example from a cell phone, the caller must typically dial an access code or a special number to access the network, before trying to connect to the intended international destination.

Therefore there is a need for a system and method for automatically routing international calls without dialing a special access number.

SUMMARY OF THE INVENTION

The invention helps solve the above problems with technology that detects international calls. When an international call is detected a database is queried. Dependent on the results of the database query, the call is either routed using intentional routing or the call is routed using an internet protocol (IP) gateway that completes the call.

DETAILED DESCRIPTION OF THE PREFERRED EMBODIMENT

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
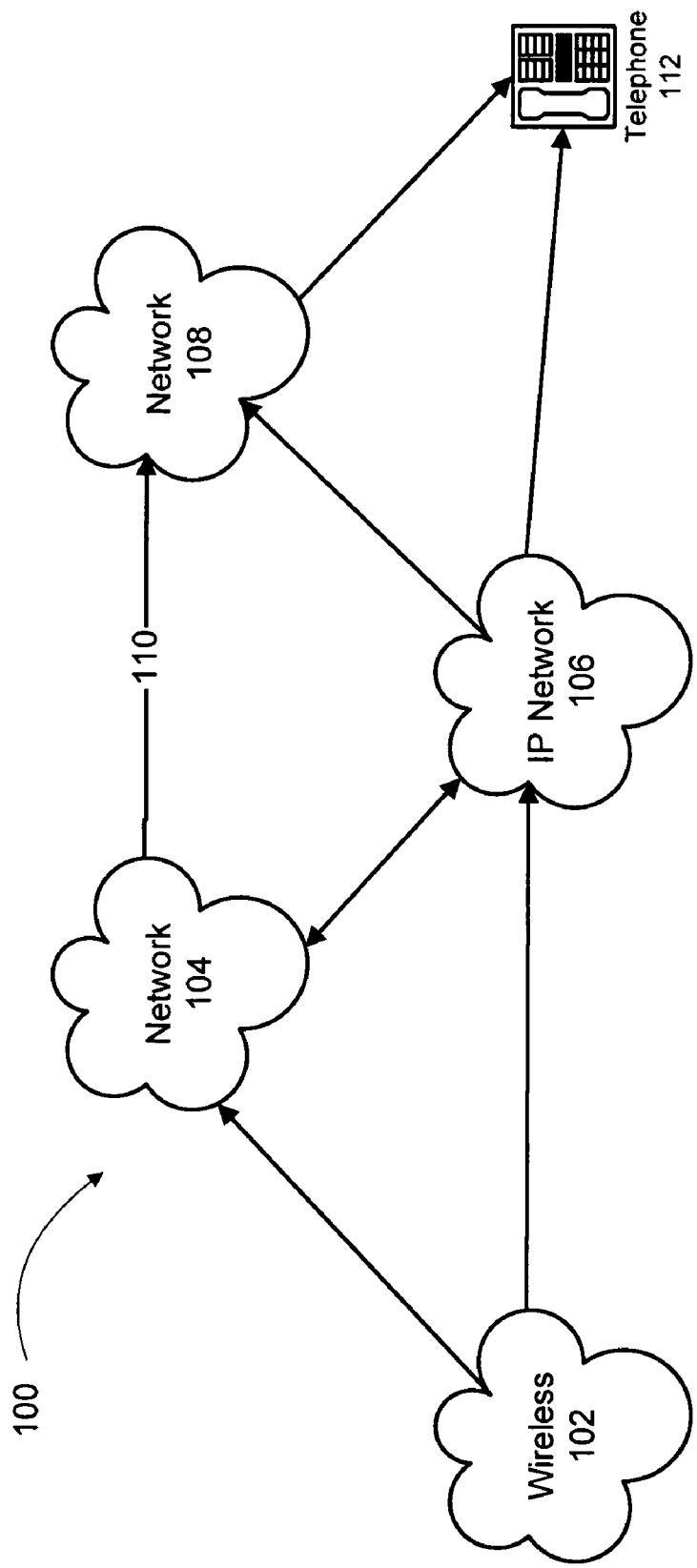
FIG. 1 illustrates a network architecture in an example of the invention.

Network Architecture—FIG. 1

FIG. 1 illustrates network architecture 100 in an example embodiment of the invention. Network architecture 100 includes wireless network 102 connected to communication network 104. Wireless network 102 is also connected to IP network 106. Communication network 104 is connected to communication network 108. Communication network 104 is connected to IP network 106. IP network 106 is connected to communication network 108. Communications network 108 is connected to a phone 112. IP network may also be connected to phone 112.

Communication network 104 is a communication network operated by a first service provider operating in a first country, for example the U.S. Wireless network 102 may also be operated by the first service provider. Communication network 108 is a communication network operated by a second service provider operating in a second country, for example Korea. Networks 104 and 108 are connected by an international transport connection 110. A caller in the U.S. wishing to call a phone in Korea may connect from network 104, to network 108 using link 110. Network 108 would then terminate the call to the phone 112 in Korea. When using a wireless phone the call may be connected from wireless network 102 through network 104, to network 108.

Communication network 104 is also connected to Internet Protocol (IP) network 106. IP network 106 is also connected to communication network 108. IP network 106 is a network operated by a customer of communication network 104. It may be considerably cheaper for the customer to connect a call from the U.S. to Korea using their IP network 106, instead of having the call routed over the international transport connection 110. Currently, to direct the connection to use IP network 106, a caller must typically first dial a special number or access code, before dialing the Korean number. A caller must typically dial the special number even when the destination number is internal to the IP network 106 if the calling number in not within the IP network. Only when both the calling number and the destination number are inside the IP network, is the call automatically routed using the IP network without having to dial the special number or access code. In some cases even when both the calling number and the called number are both within the IP network, a special prefix or code must be dialed for the connection to be made using the IP network.

In one example embodiment of the invention, the source number or calling number for all internationally called numbers originating in the first service provider's networks 102 and 104, would be checked against a database (not shown) of calling numbers. If the calling number was not in the database, then the call would be routed normally, using the international transport connection 110. If the calling number was in the database, the call would be automatically routed through the IP network 106 to connect the call.

Figure 2:
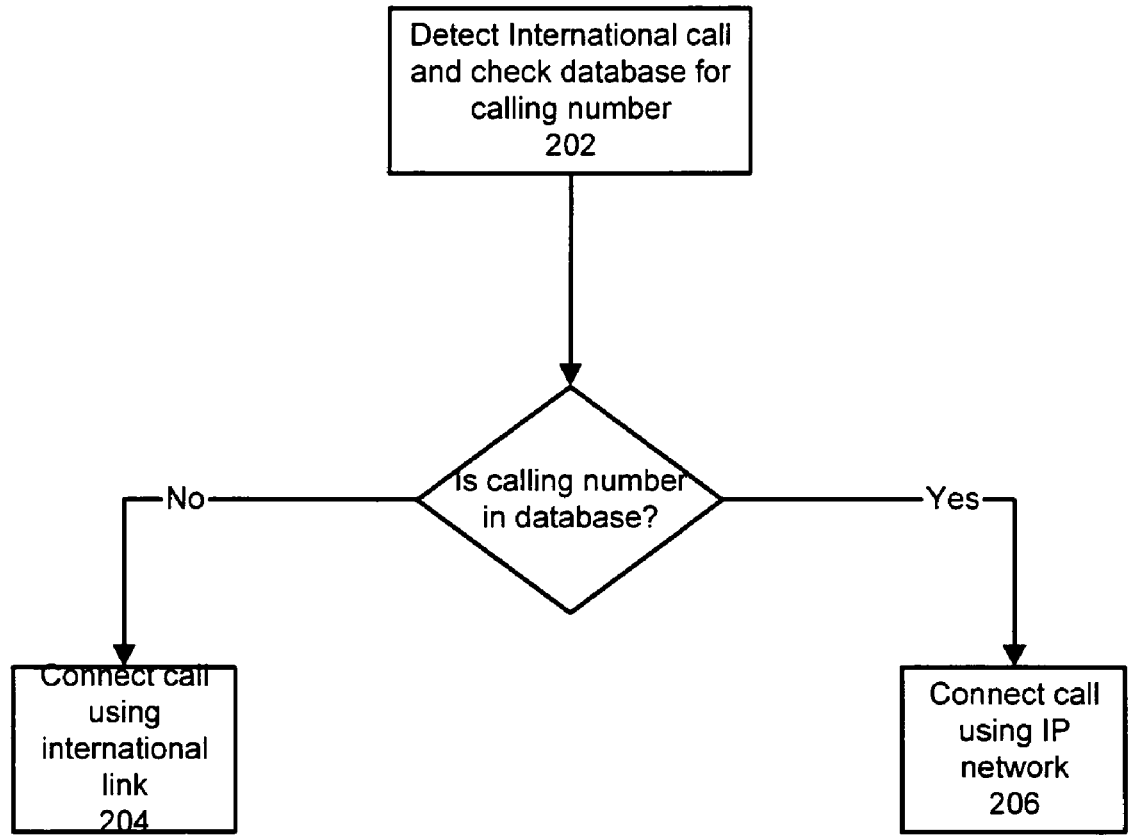
FIG. 2 is a flow chart for operating a communication network in an example embodiment of the invention.

FIG. 2 is a flow chart for an example embodiment of the invention. At step 202, all international calls would be detected and a database would be checked for a match to the calling number. When the calling number is not in the database, the call would be connected using the international link 204. When the calling number is in the database, the call is connected through an IP network. The IP network may use voice over IP (VoIP) when connecting the call. The database would comprise all the numbers that the customer wished to connect to international destinations using the customers IP network. This would allow the customer to setup a group of calling numbers that would automatically use their IP network when calling an international destination. The list of calling numbers may include cell numbers or landline numbers, for example the CEO's cell number and the CEO's home phone number. The database may be updated. The database may be updated periodically or the update may be event driven, for example using an update command. The update may add or delete numbers to the database. Using the update command, numbers could be added or deleted from the database, real time, depending on conditions in the IP network. For example, when the IP network use is nearing capacity, the database may be updated by deleting most or all of the numbers in the database. By removing most or all of the numbers from the database, most or all of the calls to international numbers will be routed using the default international routing. In this manner, connections to international numbers through the IP gateways may be guaranteed a predetermined level of service. As is well know in the arts, removing the numbers from the database may mean that the numbers are not physically removed, they may be "removed" by setting a flag that inactivates the number.

The database may check the calling numbers full 12 digit international number, or may use a subset of the 12 digits to determine if there is a match in the database. For example, the customer may have a set of cell phones that have exclusive use of the same prefix. The database may only need to detect the prefix to determine that the number is in the database. The database may only use the last 7 digits of the full 12 digit number, or the database may only receive the last 7 digits of the number, to use when determining if a match exists.

In another example embodiment of the invention, the source number or calling number for all internationally called numbers originating in the customer's IP network 106, would be checked against a database (not shown) of calling numbers. When the calling number is not in the database then the number would be routed using the international link. The call would be connected from network 106 to network 104, across international link 110 to network 108. Network 108 would terminate the call to telephone 112. When the calling number was in the database the call would route from IP network 106, to network 108 and network 108 would terminate the call. If the called number (telephone 112) and the calling number are both inside IP network 106 then IP network would terminate the call. In some cases it may be desirable to use the international connection instead of the IP network to route an international call originating inside the IP network. For example, some IP networks may not be able to guaranty a high quality of service, where typically the international communication routes do guaranty a high quality level. In this case the default may be that the calls are routed using the IP network when not in the database, and the calling numbers in the database are the ones that are connected using the international link 110. In this example only calling numbers that needed a high quality level would be included in the database, for example the CEO's number, all other numbers would default to using the inexpensive IP network to connect the calls.

In another example embodiment, the decision to route the call would use both the calling number and the destination number (also described as the called number). In this example the calling number would be checked to determine if it is in the database. If it is, then the dialed number would be checked to see if it was in the database. If both the called number and the calling number are in the database, the call would be connected using the preferred path. Otherwise the call would be connected using the default path. The numbers may be checked against the database in any order. The preferred path may be either the route using the international link or it may be the route using the IP network. When the preferred path is the route using the international link then the default path would be using the IP network. In this embodiment the preferred path is only used when both the calling number and the destination number are in the database. As is well know in the arts, a number is not considered "in" the database unless it is actually there and also active.

In another embodiment, the calling number and the called number's country code would be checked to see if that country code was in the database. The customers IP network may not connect to a communication network in all countries. For example, the customer's IP network may connect to Korea, but not to Australia. When the called number's country code and the calling number are both in the database, the call would be connected using the preferred routing. Otherwise the call would be connected using the default routing. There are fewer country codes than there are phone numbers. Therefore checking for a country code in the database may be quicker than checking for a phone number. The country code is also dialed before the phone number, so the country code may be available before the phone number is available.

In another example embodiment, the decision to route the call using the preferred path would use both the calling number and the current conditions. The preferred path would be used only under certain conditions, for example when traffic to the IP network is low, when a predetermined quality level can be guarantied, or at predetermined times of the day or predetermined days of the week. In this example the calling number would be checked to determine if it is in the database. If it is, then the current conditions would be checked against a set of predetermined criteria. When the current conditions meet the predetermined criteria and the calling number is in the database, the call would be connected using the preferred path. Otherwise the call would be connected using the default routing. Updates to the database may change the set of predetermined criteria, the calling numbers contained in the database, or both.

Figure 3:
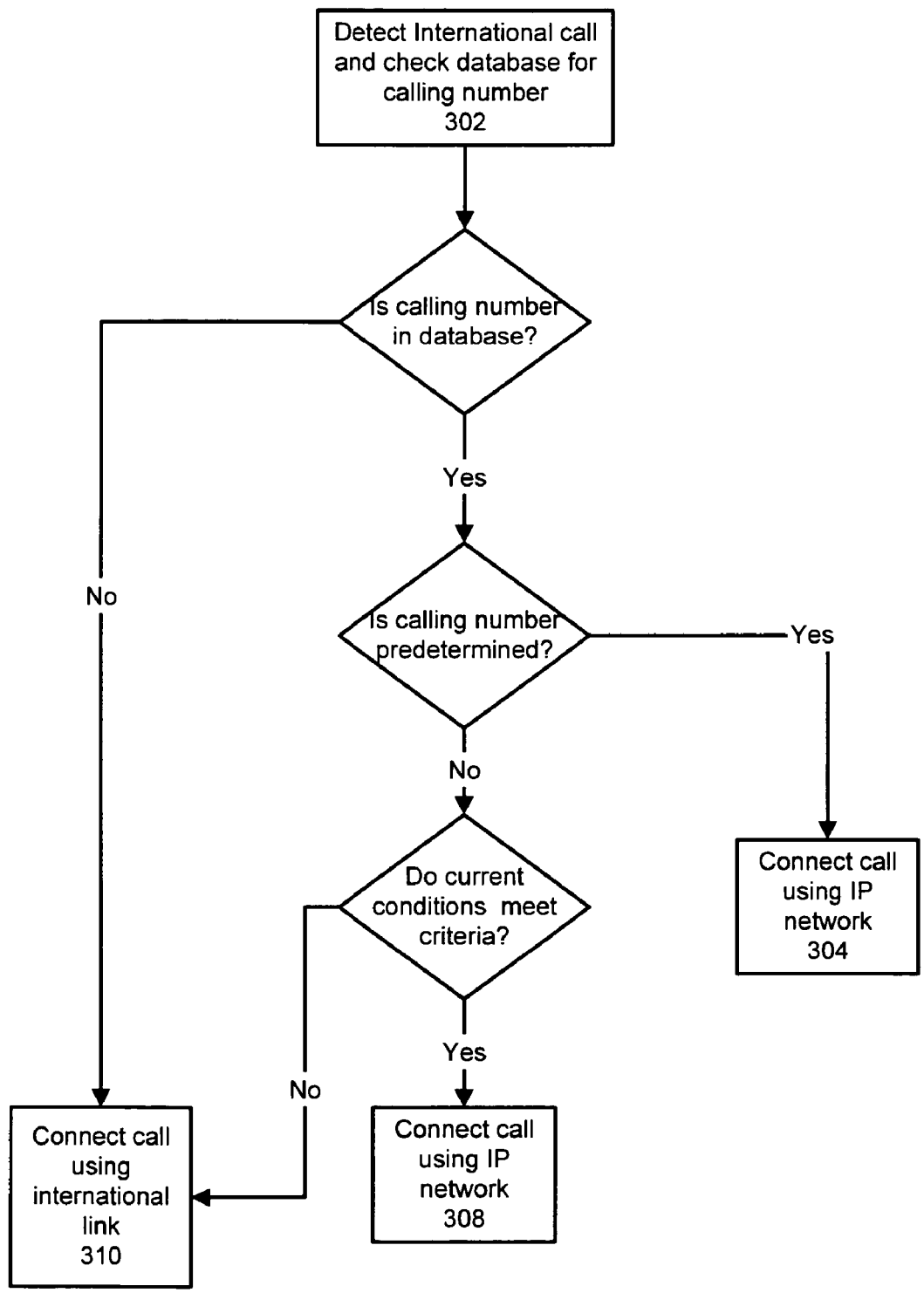
FIG. 3 is a flow chart for operating a communication network in another example embodiment of the invention.
Figure 4:
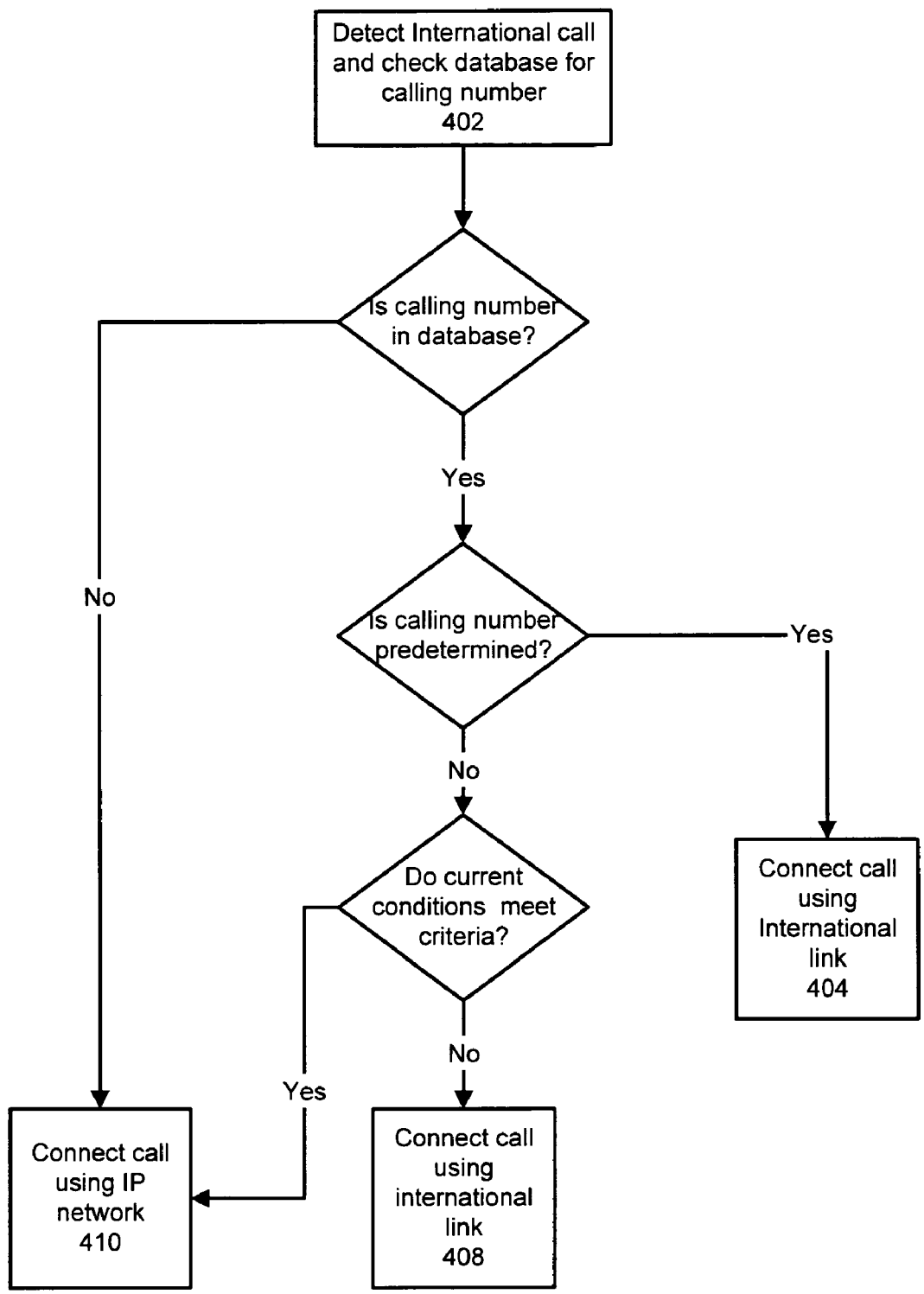
FIG. 4 is a flow chart for operating a communication network in another example embodiment of the invention.

In another example embodiment of the current invention, all the calling numbers listed in the database may not be treated equally. Some calling numbers in the database may always use the preferred path for the connection and some calling numbers in the database may use the preferred routing only under certain conditions. For example, all calls made from the CEO's home phone number may always use the preferred path for the connection. The calls made from another employee's phone may use the preferred path only under certain conditions, for example when traffic to the IP network is low or at predetermined times of the day or predetermined days of the week. FIG. 3 is a flow chart for an example embodiment of the invention in which the preferred path is the IP network. In operation, a call to an international number would be detected and the database would be checked 302. When the calling number was one of the predetermined numbers in the database, the call would be connected using the IP network 304. If the calling number was in the database but not one of the predetermined numbers, the call would be connected using the IP network if the current conditions met the set of predetermined criteria 308. When the current conditions do not meet the predetermined criteria or the calling number is not in the database, the call would be connected using the international link 310. FIG. 4 illustrates the case where the preferred path is the international link. At step 402 the international call is detected and the database is checked for the calling number. When the calling number is not in the database the call is connected using the IP network (410). When the calling number is in the database and is one of the predetermined numbers the call is connected using the international link (404). When the calling number is not one of the predetermined numbers and the current conditions meet a predetermined set of criteria, then the call is routed using the IP network (410). When the calling number is not one of the predetermined numbers and the current conditions do not meet a predetermined set of criteria, then the call is routed using the international link.

Figure 5:
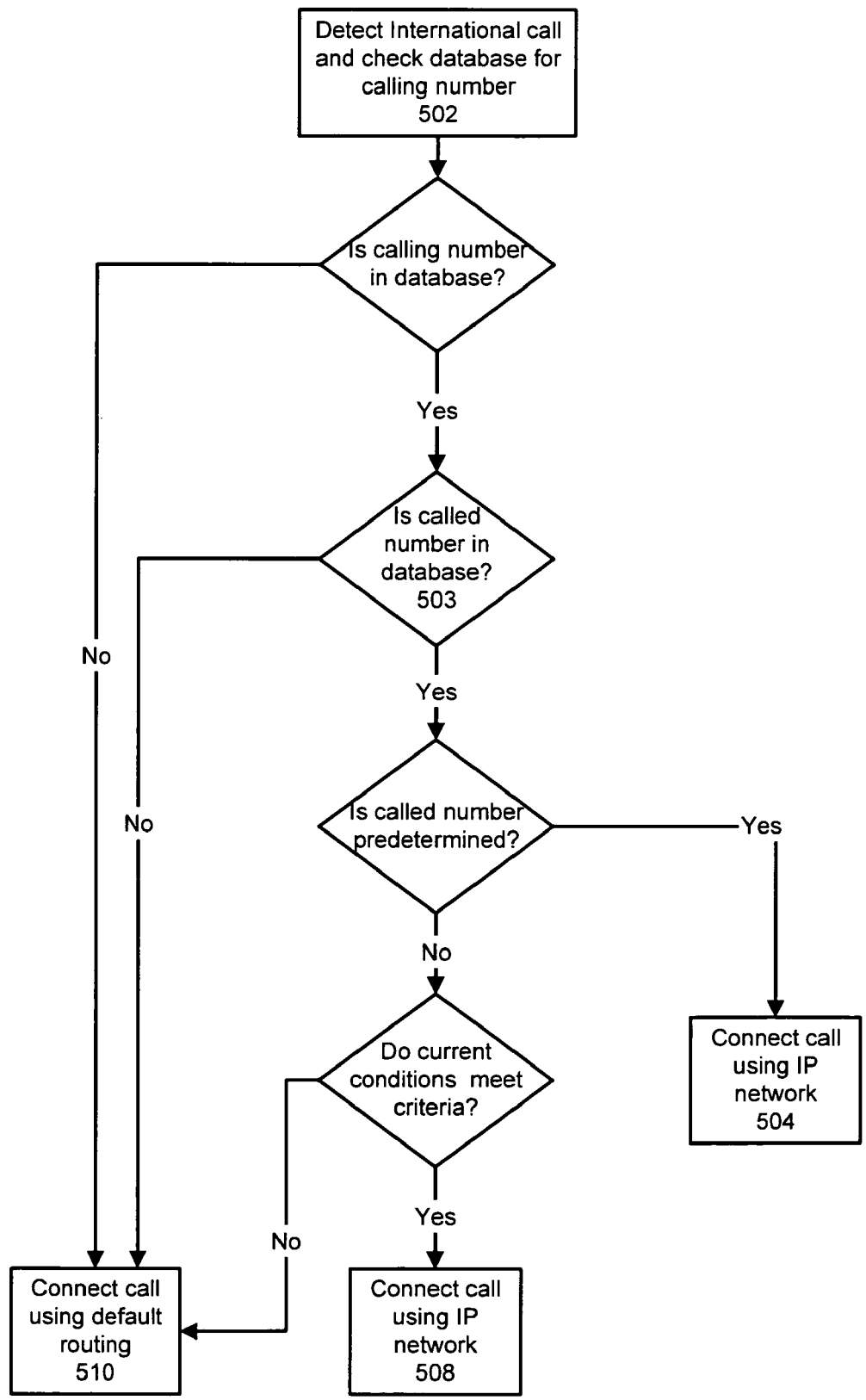
FIG. 5 is a flow chart for operating a communication network in another example embodiment of the invention.

In another example embodiment of the current invention, all the called numbers listed in the database may not be treated equally. Some called numbers in the database may always use the preferred path for the connection and some called numbers in the database may use preferred path only under certain conditions. For example, all calls made to the COO's home phone number (in Korea) may always use the preferred path for the connection. The calls made to another phone number may use the preferred path only under certain conditions, for example when traffic to an IP network is low or at predetermined times of the day or predetermined days of the week. FIG. 5 is an example embodiment where the preferred path is using an IP network. In operation, a call to an international number would be detected and the database would be checked to see if the calling number was in the database 502. When the calling number is not in the database the call is connected using the default international routing 510. When the calling number is in the database the called number is checked against the database 506. When the called number is one of the predetermined called numbers in the database, the call would be connected using the IP network 504. If the called number was in the database but not one of the predetermined numbers, the call would be connected using the IP network if the current conditions met the set of predetermined criteria 508. When the current conditions do not meet the predetermined criteria or the called number is not in the database, the call would be connected using the default international connection 510.

Figure 6:
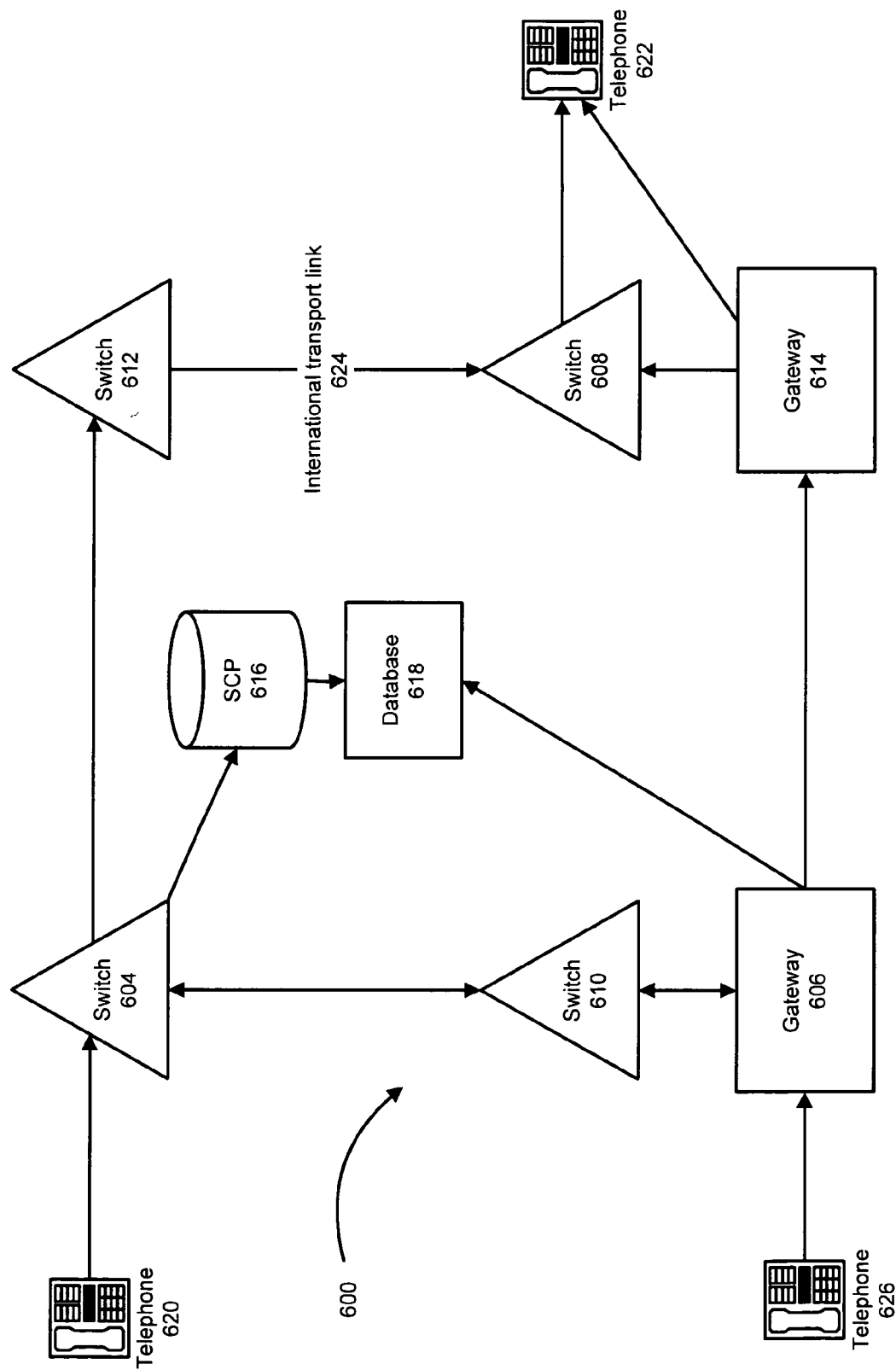
FIG. 6 illustrates a switch level view of a network architecture in an example embodiment of the invention.

Switch Level View—FIG. 6

FIG. 6 illustrates a switch level view of architecture 600 in an example embodiment of the invention. Various features of architecture 600 could be incorporated in architecture 100 of FIG. 1. Architecture 600 has switches 604, 608, 610, and 612, service control point 616, database 618, telephone 620, 622 and 626, and gateways 606 and 614. Switches 604, 610, and 612, service control point (SCP) 616, and database 618 are part of a first communications network operated by a first service provider and are interconnected using various links. The first service provider operates in a first country, for example the U.S. Switch 608 is part of a second communication network operated by a second service provider, operating in a second country. Switch 612 connects the first network to switch 608 in the second network over international transport link 624. International transport link 624 is shown as a single link, but may be comprised of a plurality of links using a plurality of different communication networks between switch 612 and switch 608. Gateways 606 and 614, are part of an Internet Protocol (IP) network operated by a customer of the first service provider. Database 618 may also be a part of the IP network. Gateway 606 is connected to the first network through switch 610. Phone 626 is connected to gateway 606. Gateway 614 is connected to the second network through switch 608. Gateway 606 is connected to gateway 614 through the IP network. Gateway 614 may be connected to phone 622.

Gateways are typically devices that connect between networks operated by different entities, between networks that use different protocols or connections between networks that are operated by different entities and use different protocols. Gateways 606 and 614 are operated by a different entity than the first network and the second network. Gateways 606 may translate between the communication protocol used by the first network and the IP protocol used by the IP network. Gateways 614 may translate between the IP protocol used by the IP network and the communication protocol used by the second network. Gateways 606 and 614 may use VoIP when transferring calls between switch 610 and switch 608. Gateways may also use VoIP when connecting phone 620 to phone 622.

In operation, when a user of telephone 620, in a first country, wishes to call a phone 622, in a second country, they dial an international phone number. In normal operations, switch 604 detects that the number is an international number, and queries SCP 616 for the proper destination switch for the international call. SCP 616 indicates that switch 612 is the proper destination switch for the international call. Switch 604 will connect to switch 612, switch 612 will connect to switch 608, and switch 608 will terminate the call to phone 622.

In an example embodiment of the invention, when SCP 616 is queried about the destination for an international call, SCP 616 will query database 618 to determine if the calling number (i.e. phone 620) is in the data base. When the calling number is not in the database, SCP 616 will use the normal or default routing and direct switch 604 to connect the call to switch 608, through switch 612. When the calling number is in the database, SCP will direct switch 604 to use the preferred routing through the IP network. The preferred routing is where switch 604 connects to switch 610, switch 610 will connect to gateway 606, gateway 606 will communicate with gateway 614 across the IP network, gateway 614 will connect to switch 608, and switch 608 will terminate the call to phone 622. The database 618 would comprise all the calling numbers that the customer operating the IP network wished to connect to international destinations using the IP network. This would allow the customer to setup a database of calling numbers that would automatically use the IP network when calling an international destination. Telephone 622 may be serviced by the IP network, for example phone 622 may be inside one of the facilities operated by the customer of the first service provider. In this example, when the calling number was in the database, SCP will direct switch 604 to connect to switch 610, switch 610 will connect to gateway 606, gateway 606 will communicate with gateway 614 across the IP network, and gateway 614 will terminate the call to phone 622.

In another example embodiment of the current invention, the calling number may be inside the IP network, for example phone 626. When an international call is detected the gateway (606) will query a database (618) to determine if the calling number is in the database. When the calling number is not in the database the call is connected using the default route. The default route in this example is from gateway 606 to switch 610, from switch 610 to switch 612, from switch 612 across international link 624 to switch 608, and switch 608 will terminate the call. When the calling number is in the database the call is routed using the preferred path. The preferred path in this example is from gateway 606 to gateway 614 using the IP network. When the destination number is not inside the IP network, gateway 614 will connect the call to switch 608, and switch 608 will terminate the call. When the destination number is inside the IP network then gateway 614 will terminate the call. When the originating or calling number is inside the IP network, the default route may be switched such that when the calling number is not in the database the IP network is used to connect the call and when the calling number is in the database the call is routed through switches 610, 604, 612, and 608 using the international link 624.

Architecture 600 shows an example of the invention where the originating call is from a landline phone 620, other example embodiments where the calling number is a cell phone, may be implemented. In the example discussed above for FIG. 6, only the fact that the calling number is contained in the database is used as the criteria to decide which route to use to connect the call. As discussed above for FIG. 1, the example embodiment for FIG. 6 may also use additional criteria in making the decision whether to connect the international call using the international link or using a routing with a path through the IP network. For example, the destination or called number may be used, the country code of the called number may be used, the current conditions may be used, or some combination of conditions may be used. A subset of the called or calling numbers in the database may be treated differently than other numbers in the database.

Database 618 in one example embodiment of the invention, is maintained and operated by the first service provider that operates the communication network that contains switches 604, 610, and 612. The first service provider may receive updates to the database from the customer that operates the IP network. The updates to database 618 may already be in the correct format for database 618, or may need translation before being transferred into database 618. If a translation is needed, a translating program may automatically convert the update into the proper format for database 618. The updates to database 618 may happen periodically, for example once a month or may be event driven, for example using an update command. The update command may be used whenever there is a change in the current conditions. When the updates happen periodically, the period may change. For example, during heavy usage period, the periods may be small (an update every minute). During light usage periods, for example late a night, the update period may be long.

In another example embodiment, database 618 may be operated and maintained by the customer that operates the IP network. SCP 616 may send the database the calling number and the called number. The database may check the current conditions, and using one of, or a combination of, the called number, the calling number and the current conditions, send a response to the SCP indicating if the connection should use the IP network or the international link. In this way the decision to use the IP network is made by the entity controlling the IP network. When the decision is made by the entity controlling the IP network, the decision maker may have more access to the conditions on the IP network. For example, when the decision is made by the communication network, only the traffic to the IP network, delivered by the communication network, can be tracked by the communication network. Traffic generated internal to the IP network can not be tracked by the communication network. In contrast, when the decision is made by the entity controlling the IP network, all the traffic, both internally generated and externally generated, can be tracked and taken into consideration. In addition, when the decision is made by the entity controlling the IP network, other conditions that effect network throughput may be taken into account before allowing calls to be routed through the IP network. As an example, the entity controlling the IP network may not allow calls to be connected through the IP network just before a backup is scheduled to occur across the network.

In another example embodiment of the invention, the database 618 is operated and controlled by the first service provider, but the SCP also queries an IP network status (not shown). The IP network status is updated by the IP network to indicate the current conditions on the IP network. The IP network status may be updated frequently, or may be updated each time the condition on the IP network changes. Using the information from the IP network status, and the information available internal to the communication network, the SCP may make a more informed decision if the call should be connected using the IP network.

We claim:

1. A method comprising:
   detecting a calling number and a called number for a call to an international number;
   determining if the calling number and the called number are each one of a plurality of predetermined numbers in a database;
   when the calling number and the called number are each one of the plurality of predetermined numbers in the database then routing the call to the international number using a preferred path;
   when the calling number and the called number are not each one of the plurality of predetermined numbers in the database then evaluating a set of current conditions of the preferred path against a predetermined set of criteria;
   when the set of current conditions of the preferred path meet the predetermined set of criteria then routing the call to the international number using the preferred path;
   when the calling number and the called number are not each one of the plurality of predetermined numbers in the database and the set of current conditions of the preferred path do not meet the predetermined set of criteria, then evaluating a country code of the called number;
   when the country code of the called number is an international country code, then routing the call to the international number using the preferred path;
   otherwise routing the call to the international number using a default path.

2. The method of claim 1 where the preferred path comprises an IP network.

3. The method of claim 2 where the IP network connects the call to the international number using VoIP.

4. The method of claim 2 where the IP network is operated by a first entity and the call to the international number originates in a communication network operated by a second entity.

5. The method of claim 2 where the default path comprises an international communications link.

6. The method of claim 1 where the default path comprises an IP network and the call to the international number originates in the IP network.

7. The method of claim 6 where the IP network connects the call to the international number using VoIP.

8. The method of claim 1 where the preferred path comprises an international communications link and the call to the international number originates in an IP network.

9. The method of claim 1 further comprising:
listing the calling number in the database when the calling number is serviced by a portable communication service (PCS) and billed to a first customer.

10. The method of claim 1 further comprising:
receiving an update to the database where the update comprises a group of calling numbers to be routed through the preferred path.

11. The method of claim 1 where one of the predetermined set of criteria is an IP network traffic level of the preferred path, and one of the set of current conditions is if the IP network traffic level of the preferred path is below a predetermined threshold.

12. The method of claim 1, further comprising:
when the calling number and the called number are not each one of the plurality of predetermined numbers in the database, the set of current conditions of the preferred path do not meet the predetermined set of criteria, and the country code of the called number is not an international country code, then evaluating a time the call to the international number originated;
when the time the call to the international number originated is a predetermined time of day, then routing the call to the international number using the preferred path;
otherwise routing the call to the international number using a default path.

13. The method of claim 1, further comprising:
when the calling number and the called number are not each one of the plurality of predetermined numbers in the database, the set of current conditions of the preferred path do not meet the predetermined set of criteria, and the country code of the called number is not an international country code, then evaluating a day the call to the international number originated;
when the day the call to the international number originated is a predetermined day of the week, then routing the call to the international number using the preferred path;
otherwise routing the call to the international number using a default path.

14. The method of claim 1 further comprising:
receiving an update to the database where the update comprises a group of called numbers to be routed through the preferred path.

15. The method of claim 1 where the database is controlled by an operator of a communication network.

16. The method of claim 1 where updates to the database are event driven.

17. An apparatus, comprising:
a first device configured to determine a called number and a calling number of an international call;
the first device configured to communicate with a second device to determine a route for the international call;
wherein the route for the international call is a preferred path when the calling number and the called number are each one of a predetermined plurality of numbers in the second device;
wherein the route for the international call is the preferred path when the calling number and the called number are not each one of the predetermined plurality of numbers in the second device and when a set of current conditions of the preferred path meet a predetermined set of criteria;
wherein the route for the international call is the preferred path when the calling number and the called number are not each one of the predetermined plurality of numbers in the second device, when the set of current conditions of the preferred path do not meet the predetermined set of criteria, and when a time the call to the international number originated is a predetermined time of day;
otherwise the route for the international call is a default path.

18. The apparatus of claim 17 where the first device is a switch in a communications network and the second device is a service control point in the communications network.

19. The apparatus of claim 17 where the first device is a device in an IP network and the second device is a database in the IP network.

20. The apparatus of claim 17 where the default path uses an international communications link and the preferred path uses an IP network.

21. The apparatus of claim 20 where the IP network connects the international call using VoIP.

22. The apparatus of claim 17 where the preferred path uses an international communications link and the default path uses an IP network.

23. The apparatus of claim 17 where the calling number is one of the predetermined plurality of numbers in the second device when the calling number is serviced by a portable communication service (PCS) and billed to a first customer.

24. The apparatus of claim 17 further comprising:
a program configured to update the second device using data provided by a first customer, where the data comprises a list of calling numbers to be routed through the preferred path.

25. The apparatus of claim 24 where the data further comprises a list of called numbers to be routed through the preferred path.

26. The apparatus of claim 24 where the program is configured to update the second device periodically.

27. The apparatus of claim 17 where one of the predetermined set of criteria is an IP network traffic level of the preferred path, and one of the set of current conditions is if the IP network traffic level of the preferred path is below a predetermined threshold.

28. The apparatus of claim 17, comprising:
wherein the route for the international call is the preferred path when the calling number and the called number are not each one of the predetermined plurality of numbers in the second device, when the set of current conditions of the preferred path do not meet the predetermined set of criteria, when a time the call to the international number originated is not a predetermined time of day, and when a day the call to the international number originated is a predetermined day of the week;
otherwise the route for the international call is a default path.

* * * * *

UNITED STATES PATENT AND TRADEMARK OFFICE
CERTIFICATE OF CORRECTION

| | | |
|---|---|---|
| PATENT NO. | : 7,616,753 B2 | Page 1 of 1 |
| APPLICATION NO. | : 10/837855 | |
| DATED | : November 10, 2009 | |
| INVENTOR(S) | : Cope et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1575 days.

Signed and Sealed this

Fourteenth Day of December, 2010

David J. Kappos
*Director of the United States Patent and Trademark Office*